(12) United States Patent
Uejima et al.

(10) Patent No.: US 12,470,235 B2
(45) Date of Patent: *Nov. 11, 2025

(54) RADIO-FREQUENCY MODULE AND COMMUNICATION APPARATUS

(71) Applicant: Murata Manufacturing Co., Ltd., Kyoto (JP)

(72) Inventors: Takanori Uejima, Kyoto (JP); Hiromichi Kitajima, Kyoto (JP); Naoya Matsumoto, Kyoto (JP); Hisanori Murase, Kyoto (JP); Nanami Yumura, Kyoto (JP); Yoichi Sawada, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 402 days.

This patent is subject to a terminal disclaimer.

(21) Appl. No.: 18/168,682

(22) Filed: Feb. 14, 2023

(65) Prior Publication Data

US 2023/0198556 A1 Jun. 22, 2023

Related U.S. Application Data

(63) Continuation of application No. PCT/JP2021/031451, filed on Aug. 27, 2021.

(30) Foreign Application Priority Data

Sep. 17, 2020 (JP) .................................. 2020-156425

(51) Int. Cl.
*H04B 1/40* (2015.01)
*H04B 1/03* (2006.01)
(Continued)

(52) U.S. Cl.
CPC .................. *H04B 1/03* (2013.01); *H04B 1/04* (2013.01); *H04B 1/18* (2013.01); *H04B 2001/0408* (2013.01)

(58) Field of Classification Search
CPC ... H04B 1/03; H04B 1/04; H04B 1/16; H04B 1/18; H04B 2001/0408; H04B 1/00;
(Continued)

(56) References Cited

U.S. PATENT DOCUMENTS 6,455,880 B1 * 9/2002 Ono ..................... H10D 30/875
257/E29.32
6,555,763 B1 * 4/2003 Hirasawa .......... H01L 23/49805
174/262

(Continued)

FOREIGN PATENT DOCUMENTS

CN 1848677 A 10/2006
CN 102315199 A 1/2012
(Continued)

OTHER PUBLICATIONS

International Search Report for PCT/JP2021/031451 dated Nov. 16, 2021.

*Primary Examiner* — Andrew Wendell
(74) *Attorney, Agent, or Firm* — McDonald Hopkins LLC

(57) ABSTRACT

A radio-frequency module includes: a module substrate having a major face; a first circuit component and a second circuit component that are disposed over the major face; a resin component that covers the first circuit component and the second circuit component; a metal shield layer that covers a surface of the resin component; a metal shield plate that is disposed over the major face and, with the module substrate seen in plan view, located between the first circuit component and the second circuit component; and a via-conductor disposed in the module substrate and set to a ground potential. The metal shield plate is in contact with the
(Continued)

metal shield layer, and connected at the major face with the via-conductor. The metal shield plate has a thickness greater than a thickness of the metal shield layer and less than or equal to an outside diameter (of the via-conductor.

20 Claims, 5 Drawing Sheets

(51) Int. Cl.
    *H04B 1/04*     (2006.01)
    *H04B 1/16*     (2006.01)
    *H04B 1/18*     (2006.01)
(58) Field of Classification Search
    CPC . H04B 1/38; H04B 1/40; H04B 1/005; H04B 7/02; H04B 7/0413; H01L 23/00; H01L 23/28
    See application file for complete search history.

(56) References Cited

U.S. PATENT DOCUMENTS

| | | | |
|---|---|---|---|
| 7,435,680 B2 * | 10/2008 | Nakamura | H05K 3/243 |
| | | | 257/E23.079 |
| 8,849,362 B1 | 9/2014 | Saji et al. | |
| 10,297,913 B2 * | 5/2019 | Khoury | H01Q 1/2291 |
| 2005/0048759 A1 * | 3/2005 | Hsu | H01L 23/49816 |
| | | | 257/E23.101 |
| 2007/0290327 A1 * | 12/2007 | Nakasato | H05K 3/445 |
| | | | 257/E23.006 |
| 2009/0091904 A1 | 4/2009 | Hatanaka et al. | |
| 2012/0008288 A1 | 1/2012 | Tsukamoto et al. | |
| 2012/0025356 A1 | 2/2012 | Liao et al. | |
| 2012/0168839 A1 * | 7/2012 | Perng | H01L 25/165 |
| | | | 257/296 |
| 2013/0043946 A1 | 2/2013 | Hadjichristos et al. | |
| 2017/0294895 A1 * | 10/2017 | Kakita | H01L 23/53242 |
| 2021/0399423 A1 * | 12/2021 | Hoang | H01Q 5/35 |
| 2022/0026552 A1 * | 1/2022 | Lu | H01L 23/12 |
| 2022/0344456 A1 * | 10/2022 | Guillon | H10D 62/115 |
| 2023/0163458 A1 * | 5/2023 | LoBianco | H01Q 1/2283 |
| | | | 455/573 |
| 2023/0179248 A1 * | 6/2023 | Uejima | H01L 23/552 |
| | | | 455/73 |

FOREIGN PATENT DOCUMENTS

| | | |
|---|---|---|
| JP | 2005-317935 A | 11/2005 |
| JP | 2007-157891 A | 6/2007 |
| JP | 2007-294829 A | 11/2007 |
| JP | 2012-019091 A | 1/2012 |
| JP | 2014-522216 A | 8/2014 |
| JP | 2015-111803 A | 6/2015 |
| WO | 2019181589 A1 | 9/2019 |

* cited by examiner

RADIO-FREQUENCY MODULE AND COMMUNICATION APPARATUS

CROSS REFERENCE TO RELATED APPLICATION

This is a continuation of International Application No. PCT/JP2021/031451 filed on Aug. 27, 2021 which claims priority from Japanese Patent Application No. 2020-156425 filed on Sep. 17, 2020. The contents of these applications are incorporated herein by reference in their entireties.

BACKGROUND ART

Technical Field

The present disclosure relates to a radio-frequency module, and a communication apparatus.

As mobile communication apparatuses such as mobile phones are becoming, in particular, increasingly multiband, the arrangement and configuration of circuit elements constituting the radio-frequency front-end circuit of such apparatuses are becoming increasingly complex.

Patent Document 1 discloses a circuit configuration of a transceiver (transmit and receive circuit) including the following components: a plurality of transmitters (transmit paths); a plurality of receivers (receive paths); and a switchplexer (antenna switch) disposed between an antenna, and the transmitters and the receivers. Each of the transmitters includes a transmit circuit, a transmit power amplifier (PA), and an output circuit. Each of the receivers includes a receive circuit, a receive low-noise amplifier (LNA), and an input circuit. The output circuit includes components, a transmit filter, an impedance matching circuit, and a duplexer. The input circuit includes components, such as a receive filter, an impedance matching circuit, and a duplexer. The above-mentioned configuration allows simultaneous transmission, simultaneous reception, or simultaneous transmission and reception to be executed through the switching action of the switchplexer.

Patent Document 1: Japanese Unexamined Patent Application Publication (Translation of PCT Application) No. 2014-522216

BRIEF SUMMARY

One potential issue with implementing the transceiver (transmit and receive circuit) disclosed in Patent Document 1 by a radio-frequency module incorporated in a mobile communication apparatus would be that electromagnetic coupling may occur between at least two of circuit components disposed in each of the transmit path, the receive path, and the transmit and receive path including the antenna switch. In this case, the harmonic wave components of the transmit signal at high output power that has been amplified in the PA (transmit power amplifier) may become superposed on the transmit signal, leading to potential deterioration in the quality of the transmit signal. The electromagnetic coupling may also lead to reduced isolation between the transmit and receive sides. As a result, the harmonic waves mentioned above, or spurious waves such as intermodulation distortion between the transmit signal and another radio-frequency signal may leak into the receive path, leading to potential deterioration of reception sensitivity. The above-mentioned electromagnetic coupling may also result in interference between two receive signals, and consequently deterioration of reception sensitivity.

The present disclosure has been made to address the above-mentioned problems. The present disclosure provides a radio-frequency module and a communication apparatus that allow for reduced deterioration in the quality of a transmit signal or a receive signal.

A radio-frequency module according to an aspect of the present disclosure includes: a module substrate having a major face; a first circuit component and a second circuit component that are disposed over the major face; a resin component that covers the major face, and at least part of the first circuit component and at least part of the second circuit component; a metal shield layer that covers a surface of the resin component, the metal shield layer being set to a ground potential; a metal shield plate that is disposed over the major face and, with the module substrate seen in plan view, located between the first circuit component and the second circuit component; and a via-conductor disposed in the module substrate, the via-conductor extending in a direction that crosses the major face, the via-conductor being set to a ground potential. The metal shield plate is in contact with the metal shield layer, and connected at the major face with the via-conductor. The metal shield plate has a thickness greater than a thickness of the metal shield layer and less than or equal to an outside diameter of the via-conductor.

The present disclosure makes it possible to provide a radio-frequency module and a communication apparatus that allow for reduced deterioration in the quality of a transmit signal or a receive signal.

DETAILED DESCRIPTION

Figure 1:
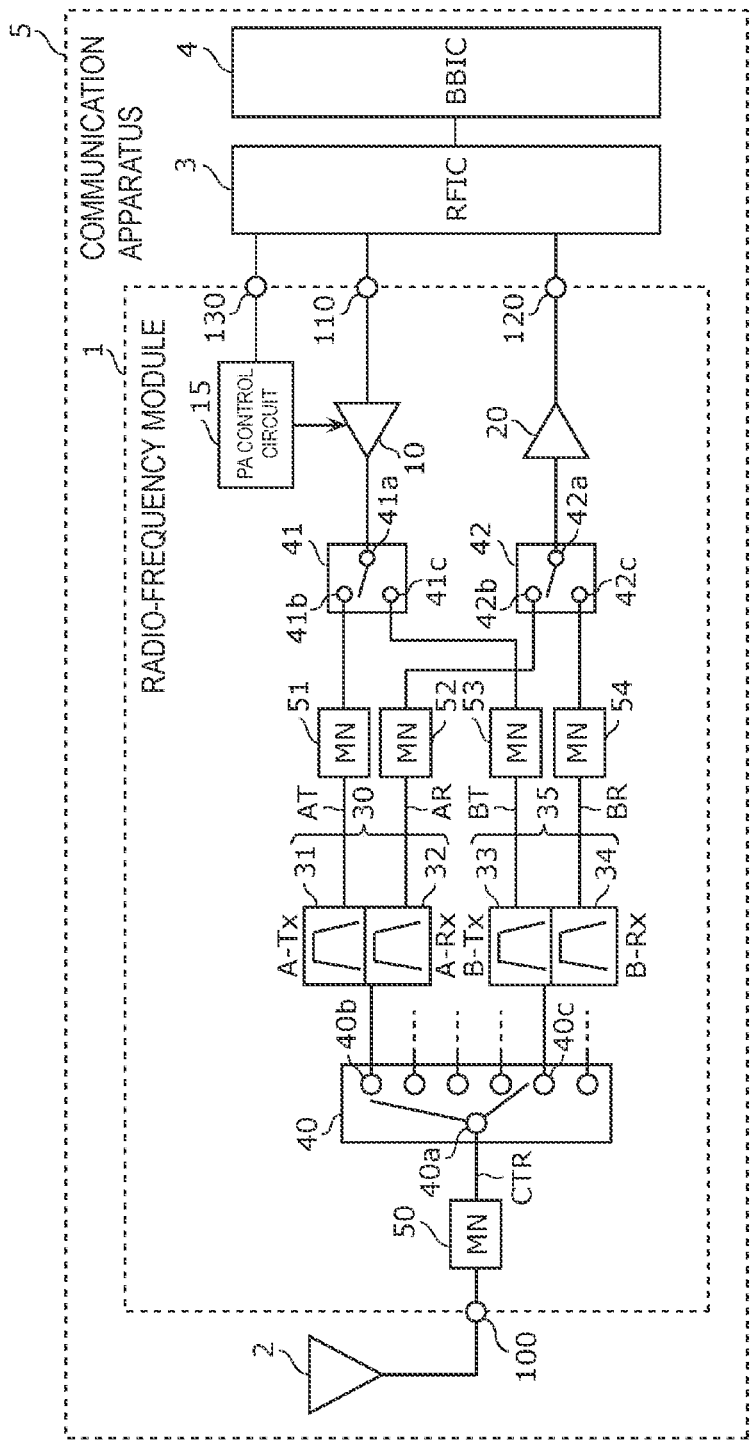
FIG. 1 illustrates the circuit configurations of a radio-frequency module and a communication apparatus according to an embodiment.

Embodiments of the present disclosure will be described below in detail. The embodiments described below represent generic or specific examples. Features presented in the following description of embodiments, inventive examples, and modifications, such as numerical values, shapes, materials, components, and the arrangement and connection of components, are illustrative only and not intended to be limiting of the present disclosure. Of the components presented in the following description of embodiments and inventive examples, those components not described in independent claims will be described as optional components. The sizes of components illustrated in the drawings or the ratios between the sizes of these components are not necessarily drawn to scale. Throughout the drawings, identical reference signs are used to designate substantially identical features, and repetitive description will be sometimes omitted or simplified.

In the following description, "parallel", "perpendicular", or other such terms indicative of the relationship between elements, "rectangular" or other such terms indicative of a shape of an element, and numerical ranges are not intended to represent only their strict meanings but are meant to also include their substantial equivalents, for example, equivalents with deviations of about a few percent.

In the figures below, an x-axis and a y-axis are mutually orthogonal axes in a plane parallel to the major face of a module substrate. A z-axis is an axis perpendicular to the major face of the module substrate. The z-axis has a positive direction defined as an upward direction, and a negative direction defined as a downward direction.

As used in the following description of the circuit configuration according to the present disclosure, the term "connected" means not only that circuit components are directly connected with each other by a connection terminal or a wiring conductor but also that circuit components are electrically connected with each other with another circuit component interposed therebetween. The expression "connected between A and B" means being located between A and B and connected with both A and B.

As used in the following description of the module configuration according to the present disclosure, expressions such as "in plan view" mean an orthographic projection of an object onto an xy-plane from the positive side of the z-axis. Expressions such as "a component is disposed over or in a major face of a substrate" include not only that the component is disposed on top of the major face of the substrate in contact with the major face, but also that the component is disposed above the major face without necessarily contact with the major face, and that the component is disposed with a portion thereof partially embedded into the substrate from the major face. Expressions such as "A is connected between B and C" mean that at least one of line segments connecting between a given point in B and a given point in C passes through A. Further, "parallel", "perpendicular", or other such terms indicative of the relationship between elements, and "rectangular" or other such terms indicative of a shape of an element are not intended to represent only their strict meanings but are meant to also include their substantial equivalents, for example, equivalents with deviations or differences of about a few percent.

As used in the following description, the term "transmit path" means a transfer line including, for example, wiring for transferring a radio-frequency transmit signal, an electrode directly connected with the wiring, and a terminal directly connected with the wiring or the electrode. The term "receive path" means a transfer line including, for example, wiring for transferring a radio-frequency receive signal, an electrode directly connected with the wiring, and a terminal directly connected with the wiring or the electrode. The term "transmit and receive path" means a transfer line including, for example, wiring for transferring a radio-frequency transmit signal and a radio-frequency receive signal, an electrode directly connected with the wiring, and a terminal directly connected with the wiring or the electrode.

EMBODIMENT

1. Circuit Configurations of Radio-Frequency Module 1 and Communication Apparatus 5

FIG. 1 illustrates the circuit configurations of a radio-frequency module 1 and a communication apparatus 5 according to an embodiment. As illustrated in FIG. 1, the communication apparatus 5 includes the radio-frequency module 1, an antenna 2, a radio-frequency integrated circuit (RFIC) 3, and a baseband integrated circuit (BBIC) 4.

The RFIC 3 represents a circuit that processes radio-frequency signals transmitted and received by the antenna 2. Specifically, the RFIC 3 applies signal processing such as down-conversion to a radio-frequency receive signal input via a receive signal path of the radio-frequency module 1, and outputs the processed receive signal to the BBIC 4. The RFIC 3 also applies signal processing such as up-conversion to a transmit signal input from the BBIC 4, and outputs the processed radio-frequency transmit signal to a transmit signal path of the radio-frequency module 1.

The BBIC 4 is a circuit that processes a signal by using a band of intermediate frequencies lower than the frequencies of radio-frequency signals that propagate in the radio-frequency module 1. The signal processed by the BBIC 4 is used as, for example, a video signal for image display, or as an audio signal for telephone conversation using a speaker.

The RFIC 3 also serves as a controller that, based on the communication band (frequency band) to be used, controls the connections of switches 40, 41 and 42 included in the radio-frequency module 1. Specifically, the RFIC 3 switches the connections of the switches 40 to 42 of the radio-frequency module 1 by a control signal (not illustrated). Specifically, the RFIC 3 outputs a digital control signal for controlling the switches 40 to 42 to a PA control circuit 15. By the digital control signal input from the RFIC 3, the PA control circuit 15 of the radio-frequency module 1 controls the connection and non-connection of the switches 40 to 42 by outputting the digital control signal to the switches 40 to 42.

The RFIC 3 also serves as a controller that controls the gain of a power amplifier 10 of the radio-frequency module 1, and a power supply voltage Vcc and a bias voltage Vbias that are to be supplied to the power amplifier 10. Specifically, the RFIC 3 outputs a digital control signal to a control signal terminal 130 of the radio-frequency module 1. By using the digital control signal input via the control signal terminal 130, the PA control circuit 15 adjusts the gain of the power amplifier 10 by outputting a control signal, the power supply voltage Vcc, or the bias voltage Vbias to the power amplifier 10. The controller mentioned above may be provided outside the RFIC 3, for example, in the BBIC 4.

The antenna 2 is connected with an antenna connection terminal 100 of the radio-frequency module 1. The antenna 2 radiates a radio-frequency signal output from the radio-frequency module 1. The antenna 2 also receives an extraneous radio-frequency signal, and outputs the received radio-frequency signal to the radio-frequency module 1.

The communication apparatus 5 according to the embodiment is not necessarily required to include the antenna 2 and the BBIC 4.

Reference is now made to a detailed configuration of the radio-frequency module 1.

As illustrated in FIG. 1, the radio-frequency module 1 includes the following components: the power amplifier 10, a low-noise amplifier 20, the PA control circuit 15, transmit filters 31 and 33, receive filters 32 and 34, matching circuits 50, 51, 52, 53, and 54, the switches 40, 41 and 42, the antenna connection terminal 100, a transmit input terminal 110, a receive output terminal 120, and the control signal terminal 130.

The antenna connection terminal 100 is connected with the antenna 2. The transmit input terminal 110 is a terminal for receiving a transmit signal from a source (RFIC 3)

external to the radio-frequency module 1. The receive output terminal 120 is a terminal for supplying a receive signal to a destination (RFIC 3) external to the radio-frequency module 1.

The power amplifier 10 is a transmit amplifier that amplifies transmit signals that are in a communication band A and a communication band B. The power amplifier 10 has an input terminal that is connected with the transmit input terminal 110, and an output terminal that is connected with each of the matching circuits 51 and 53 with the switch 41 interposed therebetween.

The low-noise amplifier 20 is a receive amplifier that provides low-noise amplification of receive signals that are in the communication band A and the communication band B. The low-noise amplifier 20 has an input terminal that is connected with each of the matching circuits 52 and 54 with the switch 42 interposed therebetween, and an output terminal that is connected with the receive output terminal 120.

The PA control circuit 15 adjusts the gain of the power amplifier 10 by, for example, a digital control signal MIPI input via the control signal terminal 130. The PA control circuit 15 may be a semiconductor integrated circuit (IC). The semiconductor IC is implemented as, for example, a complementary metal oxide semiconductor (CMOS). Specifically, the semiconductor IC is formed by a silicon-on-insulator (SOI) process. This allows for inexpensive manufacture of the semiconductor IC. The semiconductor IC may be made of at least one of GaAs, SiGe, and GaN. This makes it possible to output a radio-frequency signal with improved amplification performance and improved noise performance.

The transmit filter 31 is disposed in a transmit path AT that connects the power amplifier 10 with the switch 40. The transmit filter 31 is capable of passing, from among transmit signals amplified in the power amplifier 10, a transmit signal in a transmit band that coincides with the communication band A. The transmit filter 33 is disposed in a transmit path BT that connects the power amplifier 10 with the switch 40. The transmit filter 33 is capable of passing, from among transmit signals amplified in the power amplifier 10, a transmit signal in a transmit band that coincides with the communication band B.

The receive filter 32 is disposed in a receive path AR that connects the low-noise amplifier 20 with the switch 40. The receive filter 32 is capable of passing, from among receive signals input from the antenna connection terminal 100, a receive signal in a receive band that coincides with the communication band A. The receive filter 34 is disposed in a receive path BR that connects the low-noise amplifier 20 with the switch 40. The receive filter 34 is capable of passing, from among receive signals input from the antenna connection terminal 100, a receive signal in a receive band that coincides with the communication band B.

Non-limiting suitable examples of the transmit filters 31 and 33 and the receive filters 32 and 34 may include: surface acoustic wave filters; acoustic wave filters employing bulk acoustic waves (BAWs); LC resonant filters; and dielectric filters.

The transmit filter 31 and the receive filter 32 constitute a duplexer 30 with a pass band that coincides with the communication band A. The transmit filter 33 and the receive filter 34 constitute a duplexer 35 with a pass band that coincides with the communication band B.

Each of the duplexers 30 and 35 may be a single filter that transfers data by use of the time division duplex (TDD) method. In this case, a switch for switching between transmission and reception is disposed in at least one of the following locations: the location preceding the single filter; and the location subsequent to the single filter.

The matching circuit 50 is disposed in a transmit and receive path CTR that connects the antenna connection terminal 100 with the switch 40. The matching circuit 50 performs impedance matching between the antenna 2, the switch 40, and the duplexers 30 and 35. The matching circuit 50 includes at least one inductor. The matching circuit 50 may be disposed in series with the transmit and receive path CTR, or may be connected between the transmit and receive path CTR and ground.

The matching circuit 51 is disposed in the transmit path AT that connects the power amplifier 10 with the transmit filter 31. The matching circuit 51 performs impedance matching between the power amplifier 10 and the transmit filter 31. The matching circuit 51 includes at least one inductor. The matching circuit 51 may be disposed in series with the transmit path AT, or may be connected between the transmit path AT and ground.

The matching circuit 53 is disposed in the transmit path BT that connects the power amplifier 10 with the transmit filter 33. The matching circuit 53 performs impedance matching between the power amplifier 10 and the transmit filter 33. The matching circuit 53 includes at least one inductor. The matching circuit 53 may be disposed in series with the transmit path BT, or may be connected between the transmit path BT and ground.

The matching circuit 52 is disposed in the receive path AR that connects the low-noise amplifier 20 with the receive filter 32. The matching circuit 52 performs impedance matching between the low-noise amplifier 20 and the receive filter 32. The matching circuit 52 includes at least one inductor. The matching circuit 52 may be disposed in series with the receive path AR, or may be connected between the receive path AR and ground.

The matching circuit 54 is disposed in the receive path BR that connects the low-noise amplifier 20 with the receive filter 34. The matching circuit 54 performs impedance matching between the low-noise amplifier 20 and the receive filter 34. The matching circuit 54 includes at least one inductor. The matching circuit 54 may be disposed in series with the receive path BR, or may be connected between the receive path BR and ground.

Instead of or in addition to the matching circuits 51 and 53, a matching circuit may be disposed in the transmit path between the power amplifier 10 and the switch 41.

The switch 40 includes a common terminal 40a, and selection terminals 40b and 40c. The common terminal 40a is connected with the antenna connection terminal 100 with the matching circuit 50 interposed therebetween. The selection terminal 40b is connected with the duplexer 30, and the selection terminal 40c is connected with the duplexer 35. That is, the switch 40 is an antenna switch disposed between the antenna connection terminal 100 and each of the duplexers 30 and 35. The switch 40 serves to: (1) switch whether to connect the antenna connection terminal 100 with the duplexer 30; and (2) whether to connect the antenna connection terminal 100 with the duplexer 35. The switch 40 is implemented as a multi-connection switching circuit capable of simultaneously establishing the connections mentioned in the items (1) and (2) above.

Instead of or in addition to the matching circuits 52 and 54, a matching circuit may be disposed in the receive path between the low-noise amplifier 20 and the switch 42.

Instead of or in addition to the matching circuit 50, a matching circuit may be disposed in each of the transmit and receive path that connects the switch 40 with the duplexer 30, and the transmit and receive path that connects the switch 40 with the duplexer 35.

The switch 41 includes a common terminal 41a, and selection terminals 41b and 41c. The switch 41 is disposed in the transmit path that connects the power amplifier 10 with each of the transmit filters 31 and 33. The switch 41 switches whether to connect the power amplifier 10 with the transmit filter 31, and whether to connect the power amplifier 10 with the transmit filter 33. The switch 41 is implemented as, for example, a single-pole double-throw (SPDT) switching circuit. The common terminal 41a of the switch 41 is connected with the output terminal of the power amplifier 10, the selection terminal 41b is connected with the transmit filter 31 with the matching circuit 51 interposed therebetween, and the selection terminal 41c is connected with the transmit filter 33 with the matching circuit 53 interposed therebetween.

The switch 42 includes a common terminal 42a, and selection terminals 42b and 42c. The switch 42 is disposed in the receive path that connects the low-noise amplifier 20 with each of the receive filters 32 and 34. The switch 42 switches whether to connect the low-noise amplifier 20 with the receive filter 32, and whether to connect the low-noise amplifier 20 with the receive filter 34. The switch 42 is implemented as, for example, a single-pole double-throw (SPDT) switching circuit. The common terminal 42a of the switch 42 is connected with the input terminal of the low-noise amplifier 20, the selection terminal 42b is connected with the receive filter 32 with the matching circuit 52 interposed therebetween, and the selection terminal 42c is connected with the receive filter 34 with the matching circuit 54 interposed therebetween.

The transmit path AT is a signal path to transfer a transmit signal in the communication band A, and to connect the transmit input terminal 110 with the common terminal 40a of the switch 40. The transmit path BT is a signal path to transfer a transmit signal in the communication band B, and to connect the transmit input terminal 110 with the common terminal 40a of the switch 40. The receive path AR is a signal path to transfer a receive signal in the communication band A, and to connect the receive output terminal 120 with the common terminal 40a of the switch 40. The receive path BR is a signal path to transfer a receive signal in the communication band B, and to connect the receive output terminal 120 with the common terminal 40a of the switch 40. The transmit and receive path CTR is a signal path to transfer transmit and receive signals in the communication band A, to transfer transmit and receive signals in the communication band B, and to connect the antenna connection terminal 100 with the common terminal 40a of the switch 40.

In the radio-frequency module 1 with the circuit configuration mentioned above, the power amplifier 10, the switch 41, the matching circuit 51, and the transmit filter 31 constitute a first transmit circuit that outputs a transmit signal in the communication band A toward the antenna connection terminal 100. The power amplifier 10, the switch 41, the matching circuit 53, and the transmit filter 33 constitute a second transmit circuit that outputs a transmit signal in the communication band B toward the antenna connection terminal 100.

The low-noise amplifier 20, the switch 42, the matching circuit 52, and the receive filter 32 constitute a first receive circuit that receives a receive signal in the communication band A from the antenna 2 via the antenna connection terminal 100. The low-noise amplifier 20, the switch 42, the matching circuit 54, and the receive filter 34 constitute a second receive circuit that receives a receive signal in the communication band B from the antenna 2 via the antenna connection terminal 100.

The circuit configuration mentioned above allows the radio-frequency module 1 according to the embodiment to execute at least one of the following operations: (1) transmission and reception of a radio-frequency signal in the communication band A; (2) transmission and reception of a radio-frequency signal in the communication band B; and (3) simultaneous transmission, simultaneous reception, or simultaneous transmission and reception of a radio-frequency signal in the communication band A and a radio-frequency signal in the communication band B.

In the radio-frequency module according to the present disclosure, each of the transmit circuit and the receive circuit does not have to be connected with the antenna connection terminal 100 with the switch 40 interposed therebetween. Alternatively, each of the transmit circuit and the receive circuit may be connected with the antenna 2 with a different terminal interposed therebetween. As for the circuit configuration of the radio-frequency module according to the present disclosure, the radio-frequency module may simply include at least two of a transmit path, a receive path, and a transmit and receive path, and matching circuits disposed in the two paths. The radio-frequency module may simply include one of the first transmit circuit and the second transmit circuit. The radio-frequency module may simply include one of the first receive circuit and the second receive circuit.

One potential issue with the radio-frequency module 1 having the circuit configuration mentioned above is that if electromagnetic coupling occurs between at least two of circuit components disposed in each of the transmit path, the receive path, and the transmit and receive path, harmonic wave components of the transmit signal at high output power that has been amplified in the power amplifier may become superposed on the transmit signal, leading to deterioration in the quality of the transmit signal. Another potential issue is that the above-mentioned electromagnetic coupling may result in reduced isolation between the transmit and receive sides. As a result, the above-mentioned harmonic waves, or spurious waves such as intermodulation distortion between the transmit signal and another radio-frequency signal may leak into the receive path, leading to deterioration of reception sensitivity. Another potential issue is that the above-mentioned electromagnetic coupling may result in interference between two receive signals, which may lead to deterioration of reception sensitivity.

To address these issues, the radio-frequency module 1 according to the embodiment is designed to have a configuration to reduce the above-mentioned electromagnetic coupling. Reference is now made to how the radio-frequency module 1 according to the embodiment is configured to reduce the above-mentioned electromagnetic coupling.

2. Arrangement of Circuit Components of Radio-Frequency Module 1A According to Inventive Example 1

Figure 2A:
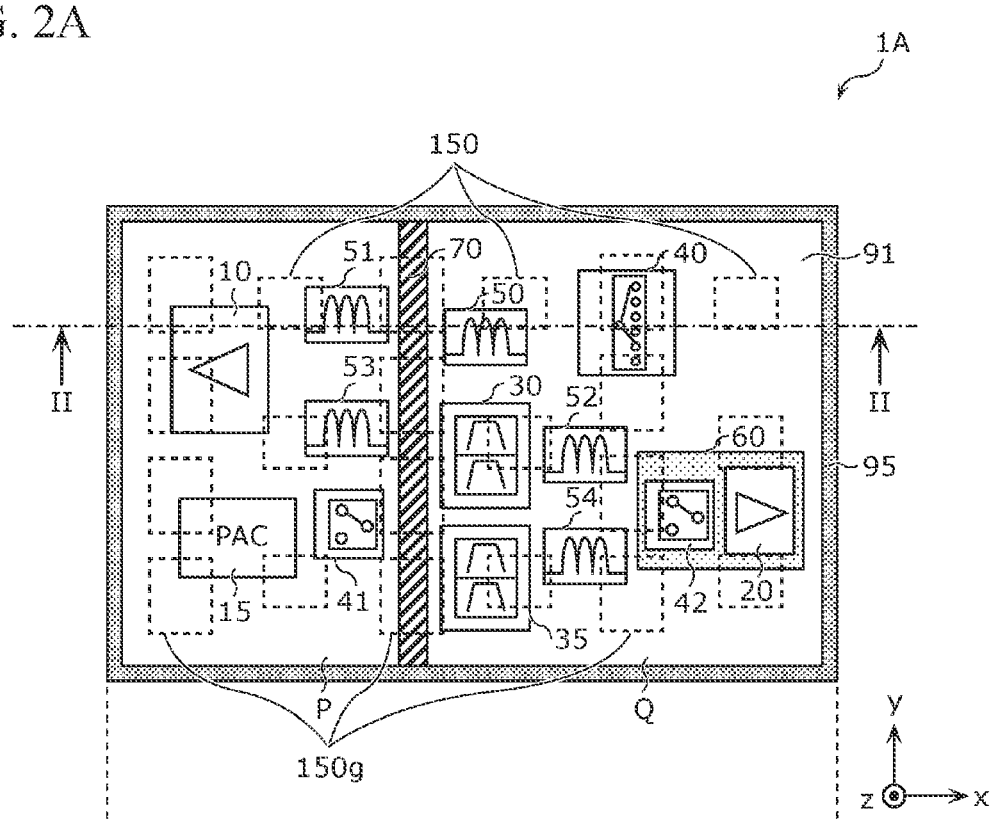
FIGS. 2A and 2B illustrate, in plan and in cross-section, a radio-frequency module according to Inventive Example 1.
Figure 2B:
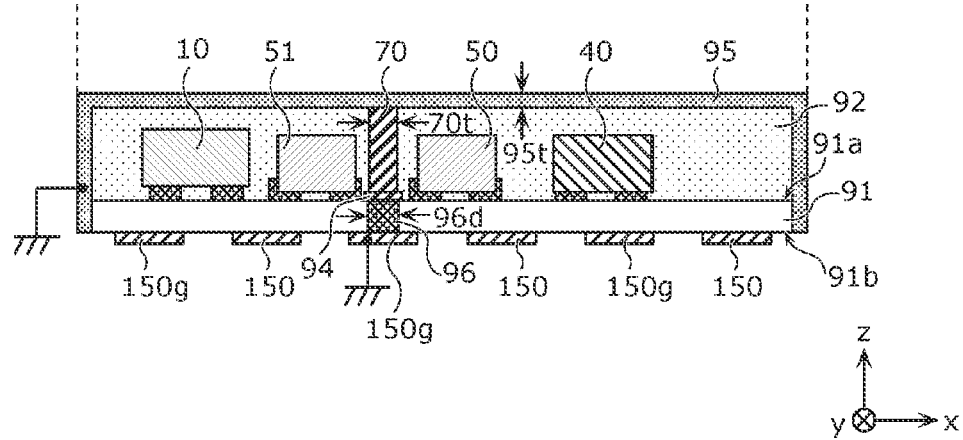

FIGS. 2A and 2B illustrates, in plan and in cross-section, a radio-frequency module 1A according to Inventive Example 1. FIG. 2A illustrates an arrangement of circuit components with a major face 91a of a module substrate 91 viewed from the positive side in the direction of the z-axis. FIG. 2B illustrates a cross-section taken along a line II-II in FIG. 2A. The radio-frequency module 1A represents a specific arrangement of circuit components constituting the radio-frequency module 1 according to the embodiment. In FIG. 2A, external connection terminals 150 and ground terminals 150g (hereinafter referred to in the singular as "ground terminal 150g" for convenience unless otherwise indicated), which are disposed over a major face 91b of the module substrate 91, are represented by broken lines.

As illustrated in FIGS. 2A and 2B, the radio-frequency module 1A according to Inventive Example 1 further includes the following components in addition to the circuit configurations illustrated in FIG. 1: the module substrate 91, a metal shield plate 70, a metal shield layer 95, a via-conductor 96, a resin component 92, and the external connection terminals 150.

The module substrate 91 is a substrate having the major face 91a on which to mount the first and second transmit circuits and the first and second receive circuits. Non-limiting examples of the module substrate 91 include the following substrates with a multilayer structure of a plurality of dielectric layers; low temperature co-fired ceramic (LTCC) substrates; high temperature co-fired ceramic (HTCC) substrates; substrates with embedded components; substrates with a redistribution layer (RDL); and printed circuit boards. The antenna connection terminal 100, the transmit input terminal 110, the receive output terminal 120, and the control signal terminal 130 may be provided over the module substrate 91.

The resin component 92 is disposed over the major face 91a of the module substrate 91. The resin component 92 covers at least part of circuit components constituting the first and second transmit circuits, at least part of circuit components constituting the first and second receive circuits, and the major face 91a of the module substrate 91. The resin component 92 serves to ensure the reliability of the above-mentioned circuit components, such as mechanical strength and moisture resistance.

The external connection terminals 150 are disposed over the major face 91b of the module substrate 91. The radio-frequency module 1A exchanges electrical signals through the external connection terminals 150 with an external substrate that is located on the negative side in the direction of the z-axis relative to the radio-frequency module 1A. Among the external connection terminals 150, the ground terminal 150g is a ground terminal set to the ground potential of the external substrate. The external connection terminals 150 may be flat electrodes disposed over the major face 91b as illustrated in FIGS. 2A and 2B, or may be bump electrodes disposed over the major face 91b.

The metal shield layer 95 covers the surface of the resin component 92, and is set to the ground potential. The metal shield layer 95 is, for example, a metallic thin film formed by sputtering.

The via-conductor 96 is disposed in the module substrate 91, and extends in a direction that crosses the major face 91a. The via-conductor 96 is set to the ground potential of the radio-frequency module 1A. According to Inventive Example 1, the via-conductor 96 extends in a direction orthogonal to the major face 91a, and penetrates the module substrate 91.

The metal shield plate 70 is a metal wall that extends perpendicularly from the major face 91a toward a top face of the resin component 92 located on the positive side in the direction of the z-axis. The metal shield plate 70 is connected at the major face 91a with the via-conductor 96. The metal shield plate 70 is in contact with the metal shield layer 95. The metal shield plate 70 may be in contact with a shield face of the metal shield layer 95 that is in contact with the top face of the resin component 92, or may be in contact with a shield face of the metal shield layer 95 that is in contact with a lateral face of the resin component 92. The metal shield plate 70 and the via-conductor 96 may be in direct contact with each other. Alternatively, as illustrated in FIG. 2B, the metal shield plate 70 and the via-conductor 96 may be connected with each other with a ground electrode 94 interposed therebetween, the ground electrode 94 being disposed over the major face 91a. The via-conductor 96 connected with the metal shield plate 70 is connected with the ground terminal 150g.

Now, with the module substrate 91 seen in plan view, the metal shield plate 70, and the ground terminal 150g connected with the metal shield plate 70 overlap each other. The metal shield plate 70 is thus connected with the ground terminal 150g with the shortest distance through the via-conductor 96. This helps to reduce parasitic inductance between the metal shield plate 70 and the ground terminal 150g. This in turn makes it possible to improve the ground of the metal shield plate 70, and consequently enhance the shielding effect.

The via-conductor 96 may be a through-via conductor that is connected at one end with the metal shield plate 70 and connected at the other end with the ground terminal 150g.

This makes it possible to further reduce parasitic inductance, improve the ground of the metal shield plate 70, and enhance the shielding effect.

As illustrated in FIG. 2A, desirably, with the module substrate 91 seen in plan view, a portion of the metal shield plate 70 that overlaps the (four) corresponding ground terminals 150g has an area greater than the area of a portion of the metal shield plate 70 that does not overlap the (four) corresponding ground terminals 150g.

This makes it possible to further reduce parasitic inductance, improve the ground of the metal shield plate 70, and enhance the shielding effect.

According to the above-mentioned configuration of the metal shield plate 70, the metal shield plate 70 is connected with ground in at least two locations, one in its upper portion and one in its lower portion. This allows for enhanced electromagnetic shielding function. A detailed structure of the metal shield plate 70 will be described later with reference to FIGS. 3A to 3C.

As illustrated in FIGS. 2A and 2B, the metal shield plate 70 has a thickness 70t. The thickness 70t is greater than a thickness 95t of the metal shield layer 95, and less than or equal to an outside diameter 96d of the via-conductor 96.

The metal shield plate 70 divides the major face 91a into a region P and a region Q. As illustrated in FIG. 2A, the power amplifier 10, the matching circuits 51 and 53, and the switch 41 represent an example of a first circuit component, and are disposed in the region P of the major face 91a. The low-noise amplifier 20, the duplexers 30 and 35, the matching circuits 50, 52, and 54, and the switches 40 and 42 represent an example of a second circuit component, and are disposed in the region Q of the major face 91a. The matching circuit 51 is disposed in the transmit path AT that connects the transmit input terminal 110 with the common terminal 40a of the switch 40. The matching circuit 51 includes a first inductor. The matching circuit 52 is disposed in the receive path AR that connects the receive output terminal 120 with the common terminal 40a of the switch 40. The matching circuit 52 includes a second inductor.

That is, the metal shield plate 70 is disposed over the major face 91a and, with the module substrate 91 seen in plan view, located between the first circuit component and the second circuit component.

According to Inventive Example 1, the first circuit component is a circuit component disposed in the transmit path AT or BT, and the second circuit component is a circuit component disposed in the receive path AR, the receive path BR, or the transmit and receive path CTR.

The first circuit component disposed in the region P may be a circuit component disposed in the receive path AR or BR, and the second circuit component disposed in the region Q may be a circuit component disposed in the transmit path AT, the transmit path BT, or the transmit and receive path CTR.

The first circuit component disposed in the region P may be a circuit component disposed in the transmit and receive path CTR, and the second circuit component disposed in the region Q may be a circuit component disposed in the transmit path AT, the transmit path BT, the receive path AR, or the receive path BR.

The configuration mentioned above allows for reduced electromagnetic coupling between at least two of circuit components disposed in each of the transmit path, the receive path, and the transmit and receive path. In this regard, the thickness 70t of the metal shield plate 70 is greater than the thickness 95t of the metal shield layer 95. This makes it possible to enhance, relative to the capability to shield against extraneous noise, the capability to reduce leakage of radio-frequency noise generated in a circuit component of the radio-frequency module 1A into another circuit component of the radio-frequency module 1A. Further, the outside diameter 96d of the via-conductor 96 is greater than or equal to the thickness 70t of the metal shield plate 70. If the outside diameter 96d of the via-conductor 96 is less than the thickness 70t of the metal shield plate 70, it is not possible to set the potential of the metal shield plate 70 strongly to the ground of the radio-frequency module 1A. The configuration according to the present example, by contrast, makes it possible to improve the ground of the metal shield plate 70. This results in the ability to reduce strong signal interference between two neighboring circuit components. This in turn helps to improve the isolation between the transmit path, the receive path, and the transmit and receive path, and consequently allows for precise reduction of deterioration in the quality of a transmit signal or a receive signal.

According to Inventive Example 1, in particular, the first circuit component may be a first inductor, and the second circuit component may be a second inductor.

This helps to reduce electromagnetic coupling between the first inductor and the second inductor, and consequently reduce deterioration of reception sensitivity that may otherwise occur due to leakage, into the receive path, of the transmit signal at high output power amplified in the power amplifier, its harmonic waves, or spurious waves such as intermodulation distortion between the transmit signal and another radio-frequency signal.

According to Inventive Example 1, in particular, the first circuit component may be the power amplifier 10, and the second circuit component may be the low-noise amplifier 20.

This helps to reduce electromagnetic coupling between the power amplifier 10 and the low-noise amplifier 20, and consequently reduce deterioration of reception sensitivity that may otherwise occur due to leakage, into the receive path, of the transmit signal at high output power amplified in the power amplifier, its harmonic waves, or spurious waves such as intermodulation distortion between the transmit signal and another radio-frequency signal.

In the radio-frequency module 1A according to Inventive Example 1, the low-noise amplifier 20 and the switch 42 may be included in a single semiconductor IC 60. This helps to reduce the area on the major face 91a required for mounting components. This allows for miniaturization of the radio-frequency module 1A. Further, the semiconductor IC 60 may include at least one of the switches 40 and 41.

3. Structure of Metal Shield Plate

Reference is now made to the structure of the metal shield plate 70 included in the radio-frequency module 1A according to Inventive Example 1.

Figure 3A:
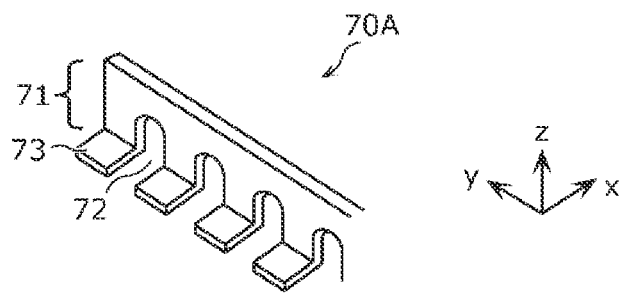
FIG. 3A is a perspective exterior view of a first example of a metal shield plate.

FIG. 3A is a perspective exterior view of a metal shield plate 70A. The metal shield plate 70A illustrated in in FIG. 3A is an example of the metal shield plate 70 according to Inventive Example 1. The metal shield plate 70A extends perpendicularly from the major face 91a (not illustrated) toward the top face of the resin component 92 (not illustrated) (i.e., in the direction of the z-axis). A hole 72 is provided between the metal shield plate 70A and the major face 91a. The hole 72 penetrates the metal shield plate 70A in the direction of the normal to the metal shield plate 70A (i.e., in the direction of the x-axis).

The metal shield plate 70A includes a body part 71, and a joint part 73. The body part 71 extends perpendicularly from the major face 91a toward the top face of the resin component 92 (i.e., in the direction of the z-axis). The joint part 73 is located near the major face 91a, and extends in parallel to the major face 91a. The joint part 73 is joined with a ground electrode (not illustrated) disposed over the major face 91a.

With the structure of the metal shield plate 70A mentioned above, the presence of the hole 72 between the body part 71 and the major face 91a helps to ensure, in forming the resin component 92 over the major face 91a, good flowability of liquid resin in the vicinity of the metal shield plate 70A. This in turn helps to reduce occurrence, in the vicinity of the metal shield plate 70A, of voids or other areas where no resin component 92 is present. Further, as described above, the metal shield plate 70A and the major face 91a are joined with each other by the joint part 73. This improves the accuracy of placement of the metal shield plate 70A, and the strength of the joining between the metal shield plate 70A and the major face 91a.

Figure 3B:
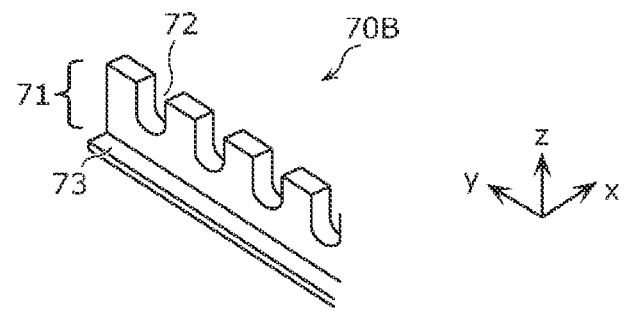
FIG. 3B is a perspective exterior view of a second example of the metal shield plate.

FIG. 3B is a perspective exterior view of a metal shield plate 70B. The metal shield plate 70B illustrated in FIG. 3B is an example of the metal shield plate 70 according to Inventive Example 1. The metal shield plate 70B extends perpendicularly from the major face 91a (not illustrated) toward the top face of the resin component 92 (not illustrated) (i.e., in the direction of the z-axis). A hole 72 is provided between the metal shield plate 70B and the top face of the resin component 92. The hole 72 penetrates the metal shield plate 70B in the direction of the normal to the metal shield plate 70B (i.e., in the direction of the x-axis).

The metal shield plate 70B includes a body part 71, and a joint part 73. The body part 71 extends perpendicularly from the major face 91a toward the top face of the resin component 92 (i.e., in the direction of the z-axis). The joint part 73 is located near the major face 91a, and extends in parallel to the major face 91a. The joint part 73 is joined with a ground electrode (not illustrated) disposed over the major face 91a.

With the structure of the metal shield plate 70B mentioned above, the presence of the hole 72 between the body part 71 and the top face helps to ensure, in forming the resin component 92 over the major face 91a, good flowability of liquid resin in the vicinity of the metal shield plate 70B. This in turn helps to reduce occurrence, in the vicinity of the metal shield plate 70B, of voids or other areas where no resin component 92 is present. Further, the absence of the hole 72 in a region that contacts the major face 91a (an area in the lower portion of the body part 71) leads to improved isolation between circuit components that are disposed over the major face 91a with the metal shield plate 70B interposed therebetween. As described above, the metal shield plate 70B and the major face 91a are joined with each other by the joint part 73. This improves the accuracy of placement of the metal shield plate 70B, and the strength of the joining between the metal shield plate 70B and the major face 91a.

Figure 3C:
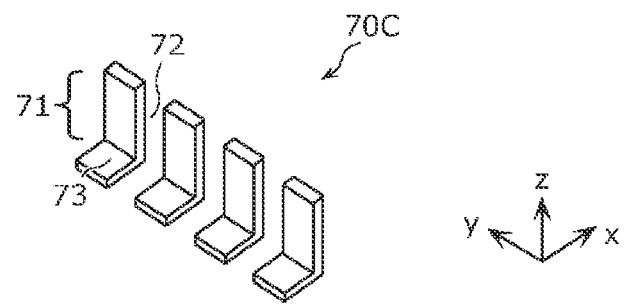
FIG. 3C is a perspective exterior view of a third example of the metal shield plate.

FIG. 3C is a perspective exterior view of a metal shield plate 70C. The metal shield plate 70C illustrated in FIG. 3C is an example of the metal shield plate 70 according to Inventive Example 1. The metal shield plate 70C extends perpendicularly from the major face 91a (not illustrated) toward the top face of the resin component 92 (not illustrated) (i.e., in the direction of the z-axis). A hole 72 is provided between the major face 91a and the top face of the resin component 92. The hole 72 penetrates the metal shield plate 70C in the direction of the normal to the metal shield plate 70C (i.e., in the direction of the x-axis).

The metal shield plate 70C includes a plurality of body parts 71, and a plurality of joint parts 73. The body parts 71 extend perpendicularly from the major face 91a toward the top face of the resin component 92 (i.e., in the direction of the z-axis). The joint parts 73 are located near the major face 91a, and extend in parallel to the major face 91a. The joint parts 73 are each joined with a ground electrode (not illustrated) disposed over the major face 91a. In the metal shield plate 70C, the body parts 71 are disposed discretely with the hole 72 interposed between adjacent body parts 71, and the joint parts 73 are disposed discretely with the hole 72 interposed between adjacent joint parts 73.

With the structure of the metal shield plate 70C mentioned above, the presence of the hole 72 between the major face 91a and the top face helps to ensure, in forming the resin component 92 over the major face 91a, good flowability of liquid resin in the vicinity of the metal shield plate 70C. This in turn helps to reduce occurrence, in the vicinity of the metal shield plate 70C, of voids or other areas where no resin component 92 is present. Further, as described above, the metal shield plate 70C and the major face 91a are joined with each other by the joint parts 73. This improves the accuracy of placement of the metal shield plate 70C, and the strength of the joining between the metal shield plate 70C and the major face 91a.

Exemplary configurations of the metal shield plate 70 are not limited to those of the metal shield plates 70A to 70C mentioned above. For example, the metal shield plate 70 may have a plurality of holes 72 extending from the major face 91a toward the top face. The joint part 73 does not necessarily extend in the negative direction of the x-axis as illustrated in FIGS. 3A to 3C, but may extend in the positive direction of the x-axis. Further, the metal shield plate 70 may include both the joint part 73 that extends in the negative direction of the x-axis and the joint part 73 that extends in the positive direction of the x-axis.

4. Structure of Via-Conductor According to Modifications

The structure of the via-conductor 96 is not limited to the one illustrated in FIGS. 2A and 2B in which the via-conductor 96 extends all the way through from the major face 91a to the major face 91b.

Figure 4:
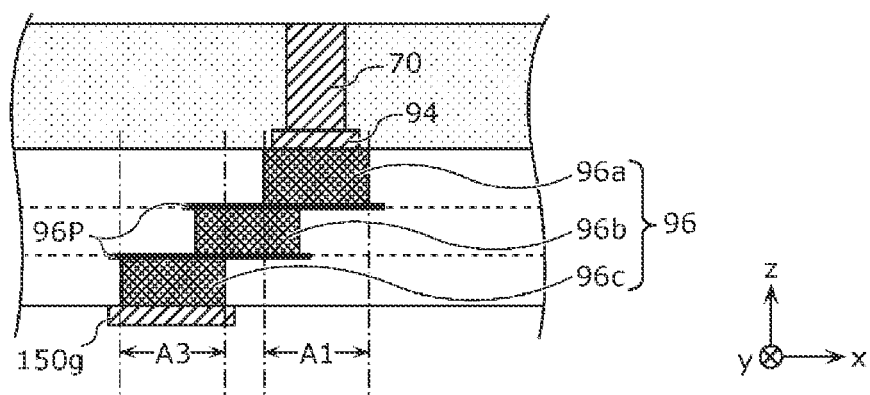
FIG. 4 is a cross-sectional view of Modification 1 of a via-conductor.

FIG. 4 is a cross-sectional view of Modification 1 of the via-conductor 96. As illustrated in FIG. 4, the via-conductor 96 includes a plurality of columnar conductors 96a, 96b, and 96c. The columnar conductors 96a, 96b, and 96c extend in a direction of the normal to the major faces 91a and 91b, and are in cascading connection with their gravity axes shifted relative to each other in the direction of the normal. The columnar conductor 96a, which is disposed furthest in the positive direction of the z-axis within the module substrate 91, is located in a region A1. The columnar conductor 96c, which is disposed furthest in the negative direction of the z-axis within the module substrate 91, is located in a region A3. With the module substrate 91 seen in plan view, the region A1 and the region A3 may have no overlap. That is, with the module substrate 91 seen in plan view, the via-conductor 96 according to Modification 1 may have no region that overlaps all of the columnar conductors 96a to 96c. The columnar conductor 96a and the columnar conductor 96b are connected with each other with a conductor pattern 96P interposed therebetween and extending in the direction of the y-axis within the module substrate 91. The columnar conductor 96b and the columnar conductor 96c are connected with each other with the conductor pattern 96P interposed therebetween and extending in the direction of the y-axis within the module substrate 91.

Figure 5:
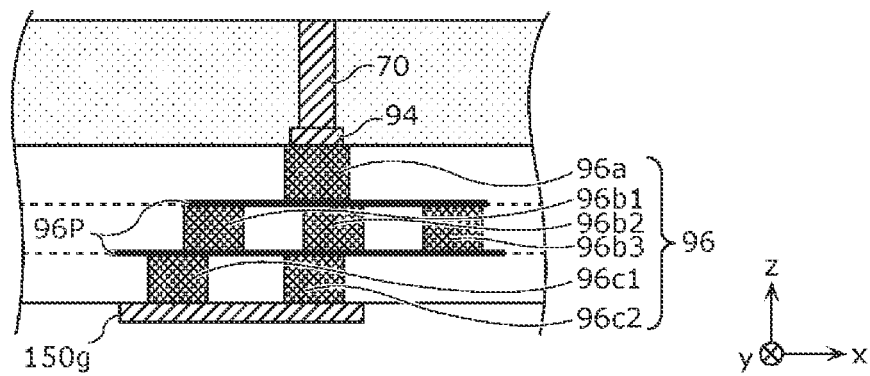
FIG. 5 is a cross-sectional view of Modification 2 of the via-conductor.

FIG. 5 is a cross-sectional view of Modification 2 of the via-conductor 96. As illustrated in FIG. 5, the via-conductor 96 includes a plurality of columnar conductors 96a, 96b1, 96b2, 96b3, 96c1, and 96c2, which extend in a direction of the normal to the major faces 91a and 91b and are in cascading connection with their gravity axes shifted relative to each other in the direction of the normal. Specifically, the columnar conductor 96a is disposed in a first layer of the module substrate 91 that is located closest to the major face 91a, the columnar conductors 96c1 and 96c2 are disposed in a third layer of the module substrate 91 that is located closest to the major face 91b, and the columnar conductors 96b1, 96b2, and 96b3 are disposed in a second layer located between the first layer and the third layer. The connection between the columnar conductor 96a, and the columnar conductors 96b1, 96b2, and 96b3 is made by the conductor pattern 96P located between the first layer and the second layer. The connection between the columnar conductors 96b1, 96b2, and 96b3, and the columnar conductors 96c1 and 96c2 is made by the conductor pattern 96P located between the second layer and the third layer.

The number of the sum (five in the present example) of the columnar conductors 96b1, 96b2, and 96b3 disposed in the second layer and the columnar conductors 96c1 and 96c2 disposed in the third layer, is greater than the number of the columnar conductors 96a (one in the present example) disposed in the first layer and connected with the metal shield plate 70.

The above-mentioned configuration helps to reduce a decrease in the strength of the ground and an associated increase in inductance that occur as the distance from the metal shield plate 70 increases.

The module substrate 90 may have any number of layers greater than or equal to two. Further, any number of columnar conductors may be disposed in each individual layer insofar as the following condition is met: The number of columnar conductors in the first layer is less than the number of the sum of columnar conductors in all layers excluding the first layer.

5. Arrangement of Circuit Components of Radio-Frequency Module 1B According to Inventive Example 2

As opposed to the radio-frequency module 1A according to Inventive Example 1 in which circuit components are disposed over one side of the module substrate 91, in a radio-frequency module 1B according to Inventive Example 2, circuit components are disposed over both sides of the module substrate 91. As described below, the radio-frequency module 1B according to Inventive Example 2 differs from the radio-frequency module 1A according to Inventive Example 1 in that the radio-frequency module 1B further includes a metal shield plate 75 disposed over the major face 91a, and the following components disposed over the major face 91b: the low-noise amplifier 20, the switches 40 and 42, connection conductors 160, and connection conductors 160g (hereinafter referred to in the singular as "connection conductor 160g" for convenience unless otherwise indicated). In the following description of the radio-frequency module 1B according to Inventive Example 2, its features different from those of the radio-frequency module 1A according to Inventive Example 1 will be mainly described, and features identical to those of the radio-frequency module 1A will not be described in further detail.

Figure 6A:
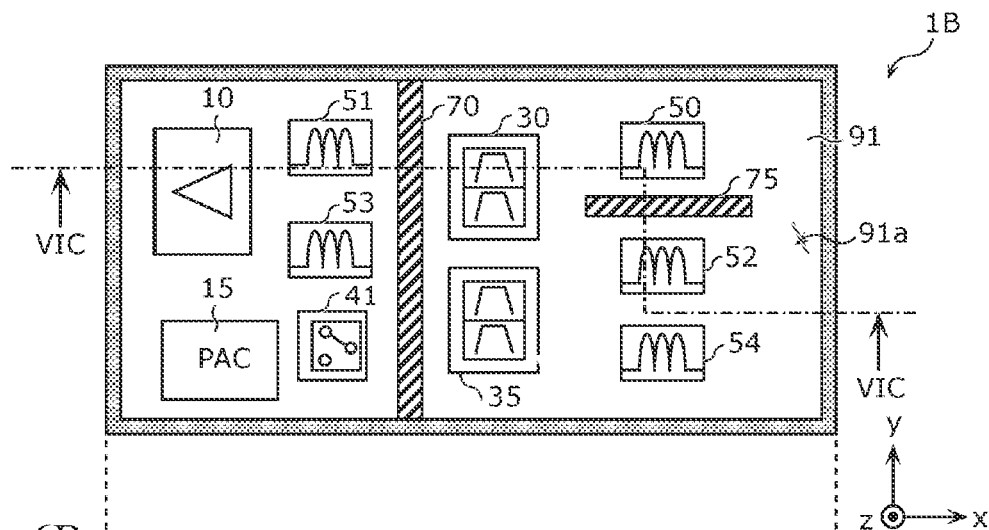
FIGS. 6A-6C illustrate, in plan and in cross-section, a radio-frequency module according to Inventive Example 2.
Figure 6B:
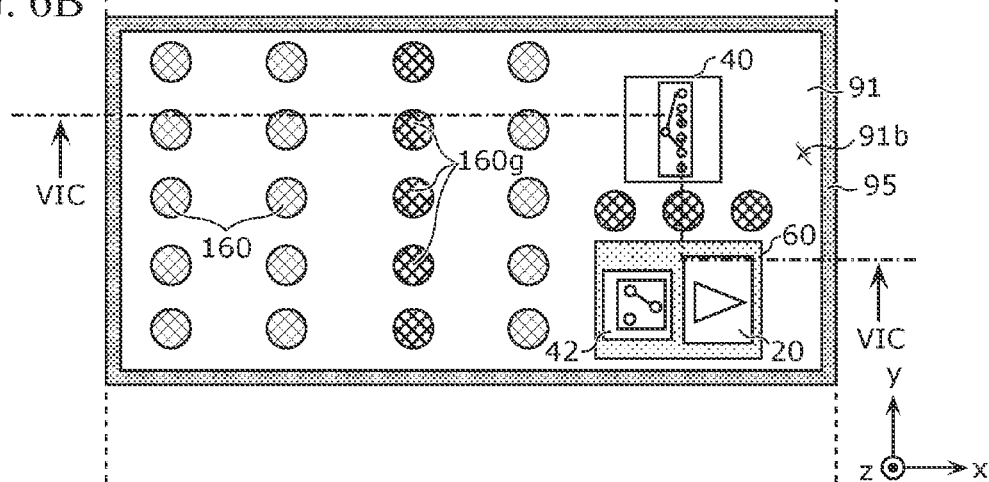
Figure 6C:
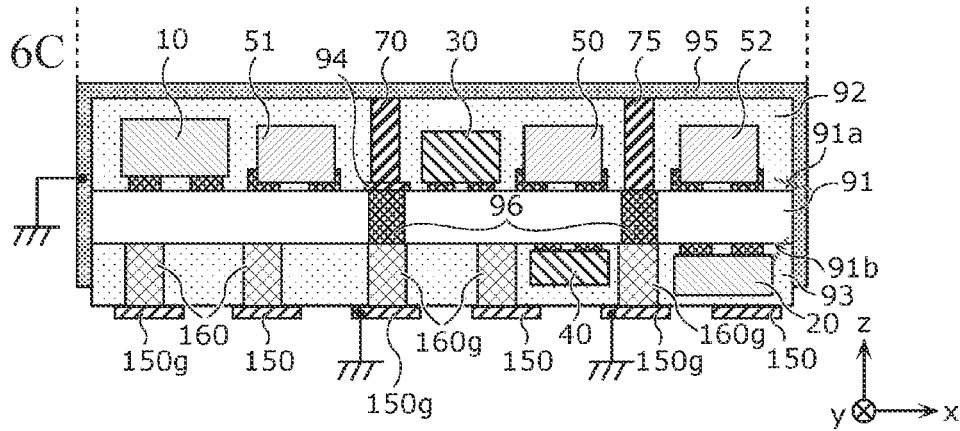

FIGS. 6A-6C illustrates, in plan and in cross-section, the radio-frequency module 1B according to Inventive Example 2. FIG. 6A illustrates an arrangement of circuit components with the major face 91a viewed from the positive side in the direction of the z-axis, the major face 91a being one of the opposite major faces 91a and 91b of the module substrate 91. FIG. 6B is a see-through illustration of an arrangement of circuit components with the major face 91b viewed from the positive side in the direction of the z-axis. FIG. 6C is a cross-section taken along a line VIC-VIC in each of FIGS. 6A-6C. The radio-frequency module 1B represents a specific arrangement of circuit components of the radio-frequency module 1 according to the embodiment.

As illustrated in FIGS. 6A-6C, the radio-frequency module 1B according to Inventive Example 2 includes the following components in addition to the circuit configurations illustrated in FIG. 1: the module substrate 91, metal shield plates 70 and 75, the metal shield layer 95, the via-conductor 96, resin components 92 and 93, the external connection terminals 150, and the connection conductors 160.

The module substrate 91 is a substrate having opposite major faces, the major face 91a (major face) and the major face 91b (back face), and on which first and second transmit circuits and first and second receive circuits are to be mounted. Non-limiting examples of the module substrate 91 include the following substrates with a multilayer structure of a plurality of dielectric layers; low temperature co-fired ceramic (LTCC) substrates; high temperature co-fired ceramic (HTCC) substrates; substrates with embedded components; substrates with a redistribution layer (RDL); and printed circuit boards. The antenna connection terminal 100, the transmit input terminal 110, the receive output terminal 120, and the control signal terminal 130 may be provided over the module substrate 91.

The resin component 93 is disposed over the major face 91b of the module substrate 91. The resin component 93 covers at least part of circuit components constituting the first and second transmit circuits, at least part of circuit components constituting the first and second receive circuits, and the major face 91b of the module substrate 91. The resin component 93 serves to ensure the reliability of the above-mentioned circuit components, such as mechanical strength and moisture resistance.

The external connection terminals 150 are located near the major face 91b of the two major faces 91a and 91b, and disposed over a surface of the resin component 93. The radio-frequency module 1B exchanges electrical signals through the external connection terminals 150 with an external substrate that is located on the negative side in the direction of the z-axis relative to the radio-frequency module 1B. Among the external connection terminals 150, the ground terminal 150g is a ground terminal set to the ground potential of the external substrate. The external connection terminals 150 may be flat electrodes disposed over the surface of the resin component 93 as illustrated in FIGS. 6A-6C, or may be bump electrodes disposed over the major face 91b or over the surface of the resin component 93.

The via-conductor 96 connected with the metal shield plate 70 is connected with the connection conductor 160g. Among the connection conductors 160 disposed over the major face 91b, the connection conductor 160g is a connection conductor set to the ground potential. The connection conductor 160g connects the via-conductor 96 with the ground terminal 150g.

The metal shield plate 75 is a metal wall that extends perpendicularly from the major face 91a toward a top face of the resin component 92 located on the positive side in the direction of the z-axis. The metal shield plate 75 is connected at the major face 91a with the via-conductor 96. The metal shield plate 75 is in contact with the metal shield layer 95. The metal shield plate 75 may be in contact with a shield face of the metal shield layer 95 that is in contact with the top face of the resin component 92, or may be in contact with a shield face of the metal shield layer 95 that is in contact with a lateral face of the resin component 92. The metal shield plate 75 and the via-conductor 96 may be in direct contact with each other, or may be connected with each other with a ground electrode interposed therebetween, the ground electrode being disposed over the major face 91a. The via-conductor 96 connected with the metal shield plate 75 is connected with the connection conductor 160g.

It is desirable that, with the module substrate 91 seen in plan view, the metal shield plate 70, and the ground terminal 150g connected with the metal shield plate 70 with the connection conductor 160g interposed therebetween overlap each other. The metal shield plate 70 is thus connected with the ground terminal 150g with the shortest distance through the via-conductor 96 and the connection conductor 160g. This allows for reduced parasitic inductance between the metal shield plate 70 and the ground terminal 150g. This in turn makes it possible to improve the ground of the metal shield plate 70, and consequently enhance the shielding effect.

It is desirable that, with the module substrate 91 seen in plan view, the metal shield plate 75, and the ground terminal 150g connected with the metal shield plate 75 with the connection conductor 160g interposed therebetween overlap each other. The metal shield plate 75 is thus connected with the ground terminal 150g with the shortest distance through the via-conductor 96 and the connection conductor 160g. This allows for reduced parasitic inductance between the metal shield plate 75 and the ground terminal 150g. This in turn makes it possible to improve the ground of the metal shield plate 75, and consequently enhance the shielding effect.

The via-conductor 96 may be a through-via conductor that is connected at one end with the metal shield plate 70 or 75, and connected at the other end with the connection terminal 160g.

This makes it possible to further reduce parasitic inductance, improve the ground of the metal shield plate 70 or 75, and enhance the shielding effect.

The metal shield plate 70 divides the major face 91a into two regions. As illustrated in FIG. 6A, the power amplifier 10, the matching circuits 51 and 53, and the switch 41 represent an example of a first circuit component, and are disposed over one region of the major face 91a. The matching circuits 52 and 54 represent an example of a second circuit component, and are disposed over the other region of the major face 91a. The switch 40 represents an example of a third circuit component, and is disposed over the major face 91b.

That is, the metal shield plate 70 is disposed over the major face 91a and, with the module substrate 91 seen in plan view, located between the first circuit component and the second circuit component.

The metal shield plate 75 is disposed over the major face 91a and, with the module substrate 91 seen in plan view, located between the matching circuit 50 (third circuit component) and the matching circuits 52 and 54 (second circuit component). That is, the metal shield plate 75 is disposed over the major face 91a and, with the module substrate 91 seen in plan view, located between the second circuit component and the third circuit component.

According to Inventive Example 2, the first circuit component is a circuit component disposed in the transmit path AT or BT, the second circuit component is a circuit component disposed in the receive path AR or BR, and the third circuit component is a circuit component disposed in the transmit and receive path CTR.

The first circuit component disposed over the one region may be a circuit component disposed in the transmit path AT or BT, the second circuit component disposed over the other region may be a circuit component disposed in the transmit and receive path CTR, and the third circuit component disposed over the major face 91b may be a circuit component disposed in the receive path AR or BR.

The first circuit component disposed over the one region may be a circuit component disposed in the receive path AR or BR, the second circuit component disposed over the other region may be a circuit component disposed in one of the transmit path AT or BT and the transmit and receive path CTR, and the third circuit component disposed over the major face 91b may be a circuit component disposed in the other one of the transmit path AT or BT and the transmit and receive path CTR.

The first circuit component disposed over the one region may be a circuit component disposed in the transmit and receive path CTR, the second circuit component disposed over the other region may be a circuit component disposed in one of the transmit path AT or BT and the receive path AR or BR, and the third circuit component disposed over the major face 91b may be a circuit component disposed in the other one of the transmit path AT or BT and the receive path AR or BR.

The configuration mentioned above allows for reduced electromagnetic coupling between circuit components disposed in each of the transmit path, the receive path, and the transmit and receive path. Further, circuit components constituting the radio-frequency module 1B are disposed over both sides of the module substrate 91 in a distributed fashion. This allows for miniaturization of the radio-frequency module 1B.

On the major face 91b, the connection conductor 160g is disposed between the switch 40, and the low-noise amplifier 20 and the switch 42. This improves the isolation between a circuit component (third circuit component) disposed in the transmit and receive path CTR, and a circuit component (second circuit component) disposed in the receive path AR or BR. This in turn helps to reduce deterioration of reception sensitivity that may otherwise occur due to leakage of spurious waves into the receive path.

5. Effects Etc.

As described above, a radio-frequency module 1A according to Inventive Example 1 includes: a module substrate 91 having a major face 91a; a first circuit component and a second circuit component that are disposed over the major face 91a; a resin component 92 that covers the major face 91a, and at least part of the first circuit component and at least part of the second circuit component; a metal shield layer 95 that covers a surface of the resin component 92, the metal shield layer 95 being set to a ground potential; a metal shield plate 70 that is disposed over the major face 91a and, with the module substrate 91 seen in plan view, located between the first circuit component and the second circuit component; and a via-conductor 96 disposed in the module substrate 91, the via-conductor 96 extending in a direction that crosses the major face 91a, the via-conductor 96 being set to a ground potential. The metal shield plate 70 is in contact with the metal shield layer 95, and connected at the major face 91a with the via-conductor 96. The metal shield plate 70 has a thickness 70t greater than a thickness 95t of the metal shield layer 95 and less than or equal to an outside diameter 96d of the via-conductor 96.

The above-mentioned configuration helps to reduce electromagnetic coupling between the first circuit component and the second circuit component. In this regard, the thickness 70t of the metal shield plate 70 is greater than the thickness 95t of the metal shield layer 95. This makes it possible to enhance, relative to the electromagnetic shielding capability of the metal shield layer 95, the capability to reduce leakage of radio-frequency noise generated in a circuit component of the radio-frequency module 1A into another circuit component of the radio-frequency module 1A. The outside diameter 96d of the via-conductor 96 is greater than or equal to the thickness 70t of the metal shield plate 70. This helps to improve the ground of the metal shield plate 70. This helps to reduce strong signal interference between the first circuit component and the second circuit component, and consequently allows for precise reduction of deterioration in the quality of a transmit signal or a receive signal.

The radio-frequency module 1A may be configured such that: the metal shield plate 70A extends perpendicularly from the major face 91a toward a top face of the resin component 92; and a hole 72 is provided between the metal shield plate 70A and the major face 91a, the hole 72 penetrating the metal shield plate 70A in a direction of a normal to the metal shield plate 70A.

According to the above-mentioned configuration, the hole 72 is provided between the metal shield plate 70A and the major face 91a. This helps to ensure, in forming the resin component 92 over the major face 91a, good flowability of liquid resin in the vicinity of the metal shield plate 70A. This in turn helps to reduce occurrence, in the vicinity of the metal shield plate 70A, of voids or other areas where no resin component 92 is present.

The radio-frequency module 1A may be configured such that: the metal shield plate 70B extends perpendicularly from the major face 91a toward a top face of the resin component 92; and a hole 72 is provided between the metal shield plate 70B and the top face, the hole 72 penetrating the metal shield plate 70B in a direction of a normal to the metal shield plate 70B.

According to the above-mentioned configuration, the hole 72 is provided between the metal shield plate 70B and the top face. This helps to ensure, in forming the resin component 92 over the major face 91a, good flowability of liquid resin in the vicinity of the metal shield plate 70B. This in turn helps to reduce occurrence, in the vicinity of the metal shield plate 70B, of voids or other areas where no resin component 92 is present.

The radio-frequency module 1A may be configured such that the metal shield plate 70 includes: a body part 71 that extends perpendicularly from the major face 91a toward a top face of the resin component 92; and a joint part 73 located near the major face 91a and extending in parallel to the major face 91a, the joint part 73 being connected at the major face 91a with the via-conductor 96.

According to the above-mentioned configuration, the metal shield plate 70 and the major face 91a are joined with each other by the joint part 73. This improves the accuracy of placement of the metal shield plate 70, and the strength of the joining between the metal shield plate 70 and the major face 91a.

The radio-frequency module 1A may be configured such that: the first circuit component is disposed in a path, the path being one of a transmit path, a receive path, and a transmit and receive path, the transmit path being a path to transfer a transmit signal, the receive path being a path to transfer a receive signal, the transmit and receive path being a path to transfer a transmit signal and a receive signal; and the second circuit component is disposed in a path, the path being one of the transmit path, the receive path, and the transmit and receive path excluding the path in which the first circuit component is disposed.

According to the above-mentioned configuration, the metal shield plate 70 is disposed between two of the transmit path, the receive path, and the transmit and receive path. This allows for reduced signal interference between the two paths. This in turn helps to improve the isolation between the transmit path, the receive path, and the transmit and receive path, and consequently allows for precise reduction of deterioration in the quality of the transmit signal or the receive signal.

The radio-frequency module 1A may be configured such that: the radio-frequency module 1A further includes a power amplifier 10 and a low-noise amplifier 20; the first circuit component is a first inductor connected with an output terminal of the power amplifier 10; and the second circuit component is a second inductor connected with an input terminal of the low-noise amplifier 20.

The above-mentioned configuration helps to reduce electromagnetic coupling between the first inductor and the second inductor. This in turn helps to reduce deterioration of reception sensitivity that may otherwise occur due to leakage, into the receive path, of the transmit signal at high output power amplified in the power amplifier 10, its harmonic waves, or spurious waves such as intermodulation distortion between the transmit signal and another radio-frequency signal.

The radio-frequency module 1A may be configured such that: the first circuit component is a power amplifier 10; and the second circuit component is a low-noise amplifier 20.

The above-mentioned configuration helps to reduce electromagnetic coupling between the power amplifier 10 and the low-noise amplifier 20, and consequently reduce deterioration of reception sensitivity that would other occur due to leakage, into the receive path, of the transmit signal at high output power amplified in the power amplifier 10, its harmonic waves, or spurious waves such as intermodulation distortion between the transmit signal and another radio-frequency signal.

The radio-frequency module 1A may be configured such that: the radio-frequency module 1A further includes a ground terminal 150g disposed over a major face 91b of the module substrate 91 that is opposite to the major face 91a, the ground terminal 150g being connected with the via-conductor 96; and with the module substrate 91 seen in plan view, the metal shield plate 70 and the ground terminal 150g overlap each other.

According to the above-mentioned configuration, the metal shield plate 70 is connected with the ground terminal 150g with the shortest distance through the via-conductor 96. This allows for reduced parasitic inductance between the metal shield plate 70 and the ground terminal 150g. This in turn makes it possible to improve the ground of the metal shield plate 70, and consequently enhance the shielding effect.

The radio-frequency module 1A may be configured such that with the module substrate 91 seen in plan view, a portion of the metal shield plate 70 that overlaps the ground terminal 150g is greater in area than a portion of the metal shield plate 70 that does not overlap the ground terminal 150g.

The above-mentioned configuration makes it possible to further reduce parasitic inductance, improve the ground of the metal shield plate 70, and enhance the shielding effect.

The radio-frequency module 1A may be configured such that the via-conductor 96 is a through-via conductor, the through-via conductor being connected at one end with the metal shield plate 70 and connected at another end with the ground terminal 150g.

The above-mentioned configuration makes it possible to further reduce parasitic inductance, improve the ground of the metal shield plate 70, and enhance the shielding effect.

The radio-frequency module 1A may be configured such that: the module substrate 91 includes a plurality of layers; the via-conductor 96 includes one or more first columnar conductors disposed in a first layer, the first layer being one of the plurality of layers that is located closest to the major face 91a, and one or more second columnar conductors disposed in all of the plurality of layers excluding the first layer; the one or more first columnar conductors are connected with the one or more second columnar conductors; and a number of the one or more second columnar conductors is greater than a number of the one or more columnar conductors.

The above-mentioned configuration helps to reduce a decrease in the strength of the ground and an associated increase in inductance that occur as the distance from the metal shield plate 70 increases.

The radio-frequency module 1B may be configured such that: the module substrate 91 further includes a major face 91b opposite to the major face 91a; the radio-frequency module 1B further includes a third circuit component disposed over the major face 91b, a ground terminal 150g disposed near the major face 91b, and a connection conductor 160g disposed over the major face 91b, the connection conductor 160g connecting the via-conductor 96 with the ground terminal 150g; the first circuit component is disposed in a path, the path being one of a transmit path, a receive path, and a transmit and receive path, the transmit path being a path to transfer a transmit signal, the receive path being a path to transfer a receive signal, the transmit and receive path being a path to transfer a transmit signal and a receive signal; the second circuit component is disposed in a path, the path being one of the transmit path, the receive path, and the transmit and receive path excluding the path in which the first circuit component is disposed; and the third circuit component is disposed in a path, the path being one of the transmit path, the receive path, and the transmit and receive path excluding the path in which the first circuit component is disposed and the path in which the second circuit component is disposed.

The above-mentioned configuration allows for reduced electromagnetic coupling between circuit components disposed in each of the transmit path, the receive path, and the transmit and receive path. Further, circuit components constituting the radio-frequency module 1B are disposed over both sides of the module substrate 91 in a distributed fashion. This allows for miniaturization of the radio-frequency module 1B.

A communication apparatus 5 includes: an RFIC 3 that processes a radio-frequency signal transmitted and received by an antenna 2; and the radio-frequency module 1 that transfers the radio-frequency signal between the antenna 2 and the RFIC 3.

The above-mentioned configuration makes it possible to provide the communication apparatus 5 with reduced deterioration in the quality of a transmit signal or a receive signal.

OTHER EMBODIMENTS, ETC.

Although the radio-frequency module and the communication apparatus according to the present disclosure have been described above by way of an embodiment, inventive examples, and modifications, the radio-frequency module and the communication apparatus according to the present disclosure are not limited to the embodiment, the inventive examples, and the modifications described above. The present disclosure is intended to encompass other embodiments implemented by combining any components in the embodiment, the inventive examples, and the modifications mentioned above, modifications obtained by modifying the embodiment, the inventive examples, and the modifications mentioned above in various ways as may become apparent to one skilled in the art without necessarily departing from the scope of the present disclosure, and various kinds of equipment incorporating the radio-frequency module and the communication apparatus.

For example, in the radio-frequency module 1A according to Inventive Example 1, the constituent circuit components of the radio-frequency module 1A are disposed over one major face 91a of the module substrate 91. Alternatively, the circuit components may be disposed over the opposite major faces 91a and 91b of the module substrate 91 in a distributed fashion. That is, the constituent circuit components of the radio-frequency module 1A may be mounted over one side of the module substrate, or may be mounted over both sides of the module substrate.

For example, in the radio-frequency module and the communication apparatus according to the embodiment, the inventive examples, and the modifications mentioned above, other circuit elements, wiring, and other features may be inserted between paths that connect the circuit elements and the signal paths that are illustrated in the drawings.

INDUSTRIAL APPLICABILITY

The present disclosure is applicable to a wide variety of communication apparatuses such as mobile phones, as a radio-frequency module disposed in a multiband-compatible front-end part of such communication apparatuses.

REFERENCE SIGNS LIST 1, 1A, 1B radio-frequency module
2 antenna
3 radio-frequency integrated circuit (RFIC)
4 baseband integrated circuit (BBIC)
5 communication apparatus
10 power amplifier
15 PA control circuit
20 low-noise amplifier
30, 35 duplexer
31, 33 transmit filter
32, 34 receive filter
40, 41, 42 switch
40a, 41a, 42a common terminal
40b, 40c, 41b, 41c, 42b, 42c selection terminal
50, 51, 52, 53, 54 matching circuit
60 semiconductor IC
70, 70A, 70B, 70C, 75 metal shield plate
70t, 95t thickness
71 body part
72 hole
73 joint part
91 module substrate
91a, 91b major face
92, 93 resin component
94 ground electrode
95 metal shield layer
96 via-conductor
96a, 96b, 96b1, 96b2, 96b3, 96c, 96c1, 96c2 columnar conductor
96d outside diameter
96P conductor pattern
100 antenna connection terminal
110 transmit input terminal
120 receive output terminal
130 control signal terminal
150 external connection terminal
150g ground terminal
160, 160g connection conductor
A1, A3 region
AR, BR receive path
AT, BT transmit path
CTR transmit and receive path
P, Q region

The invention claimed is:
1. A radio-frequency module comprising:
a module substrate comprising a major face;
a first circuit component and a second circuit component that are disposed over the major face;
a resin component that covers the major face, at least part of the first circuit component, and at least part of the second circuit component;
a metal shield layer that covers a surface of the resin component, the metal shield layer being set to a ground potential;

a metal shield plate that is disposed over the major face and, with the module substrate seen in plan view, between the first circuit component and the second circuit component; and a via-conductor disposed in the module substrate, the via-conductor extending in a direction that crosses the major face, the via-conductor being set to the ground potential, wherein the metal shield plate is in contact with the metal shield layer, and connected at the major face with the via-conductor, and wherein the metal shield plate comprises a thickness greater than a thickness of the metal shield layer and less than or equal to an outside diameter of the via-conductor.

2. The radio-frequency module according to claim 1, wherein the metal shield plate extends perpendicularly from the major face toward a top face of the resin component, and wherein a hole is between the metal shield plate and the major face, the hole penetrating the metal shield plate in a normal direction relative to the metal shield plate.

3. The radio-frequency module according to claim 1, wherein the metal shield plate extends perpendicularly from the major face toward a top face of the resin component, and wherein a hole is between the metal shield plate and the top face, the hole penetrating the metal shield plate in a normal direction relative to the metal shield plate.

4. The radio-frequency module according to claim 1, wherein the metal shield plate includes:

a body part that extends perpendicularly from the major face toward a top face of the resin component, and a joint part near the major face and extending in parallel to the major face, the joint part being connected at the major face with the via-conductor.

5. The radio-frequency module according to claim 1, wherein the first circuit component is disposed in a first path, the first path being one of a transmit path, a receive path, and a transmit and receive path, the transmit path being a path to transfer a transmit signal, the receive path being a path to transfer a receive signal, the transmit and receive path being a path to transfer the transmit signal and the receive signal, and wherein the second circuit component is disposed in a second path, the second path being one of the transmit path, the receive path, and the transmit and receive path excluding the first path in which the first circuit component is disposed.

6. The radio-frequency module according to claim 1, further comprising:

a power amplifier; and
a low-noise amplifier, wherein the first circuit component comprises a first inductor connected with an output terminal of the power amplifier, and wherein the second circuit component comprises a second inductor connected with an input terminal of the low-noise amplifier.

7. The radio-frequency module according to claim 1, wherein the first circuit component comprises a power amplifier, and wherein the second circuit component comprises a low-noise amplifier.

8. The radio-frequency module according to claim 1, further comprising:

a ground terminal disposed over a back face of the module substrate that is opposite to the major face, the ground terminal being connected with the via-conductor, wherein with the module substrate seen in plan view, the metal shield plate and the ground terminal overlap each other.

9. The radio-frequency module according to claim 8, wherein with the module substrate seen in plan view, a portion of the metal shield plate that overlaps the ground terminal is greater in area than a portion of the metal shield plate that does not overlap the ground terminal.

10. The radio-frequency module according to claim 8, wherein the via-conductor comprises a through-via conductor, the through-via conductor being connected at a first end with the metal shield plate and connected at a second end with the ground terminal.

11. The radio-frequency module according to claim 1, wherein the module substrate includes a plurality of layers, wherein the via-conductor includes:
one or more first columnar conductors disposed in a first layer, the first layer being one of the plurality of layers that is located closest to the major face, and
one or more second columnar conductors disposed in all of the plurality of layers excluding the first layer, wherein the one or more first columnar conductors are connected with the one or more second columnar conductors, and wherein a first number of the one or more second columnar conductors is greater than a second number of the one or more columnar conductors.

12. The radio-frequency module according to claim 5, wherein the module substrate further comprises a back face that is opposite to the major face, wherein the radio-frequency module further comprises:
a third circuit component disposed over the back face,
a ground terminal disposed near the back face, and
a connection conductor disposed over the back face, the connection conductor connecting the via-conductor with the ground terminal, wherein the first circuit component is disposed in a first path, the first path being one of a transmit path, a receive path, and a transmit and receive path, the transmit path being a path to transfer a transmit signal, the receive path being a path to transfer a receive signal, the transmit and receive path being a path to transfer the transmit signal and the receive signal, wherein the second circuit component is disposed in a second path, the second path being one of the transmit path, the receive path, and the transmit and receive path excluding the first path in which the first circuit component is disposed, and wherein the third circuit component is disposed in a third path, the third path being one of the transmit path, the receive path, and the transmit and receive path excluding the first path in which the first circuit component is disposed and the second path in which the second circuit component is disposed.

13. A communication apparatus comprising:

a radio-frequency integrated circuit that is configured to process a radio-frequency signal transmitted and received by an antenna; and the radio-frequency module according to claim 1 that is configured to propagate the radio-frequency signal between the antenna and the radio-frequency integrated circuit.

14. The radio-frequency module according to claim 2, wherein the metal shield plate includes:
- a body part that extends perpendicularly from the major face toward a top face of the resin component, and
- a joint part near the major face and extending in parallel to the major face, the joint part being connected at the major face with the via-conductor.

15. The radio-frequency module according to claim 3, wherein the metal shield plate includes:
- a body part that extends perpendicularly from the major face toward a top face of the resin component, and
- a joint part near the major face and extending in parallel to the major face, the joint part being connected at the major face with the via-conductor.

16. The radio-frequency module according to claim 2,
- wherein the first circuit component is disposed in a first path, the first path being one of a transmit path, a receive path, and a transmit and receive path, the transmit path being a path to transfer a transmit signal, the receive path being a path to transfer a receive signal, the transmit and receive path being a path to transfer the transmit signal and the receive signal, and
- wherein the second circuit component is disposed in a second path, the second path being one of the transmit path, the receive path, and the transmit and receive path excluding the first path in which the first circuit component is disposed.

17. The radio-frequency module according to claim 3,
- wherein the first circuit component is disposed in a first path, the first path being one of a transmit path, a receive path, and a transmit and receive path, the transmit path being a path to transfer a transmit signal, the receive path being a path to transfer a receive signal, the transmit and receive path being a path to transfer the transmit signal and the receive signal, and
- wherein the second circuit component is disposed in a second path, the second path being one of the transmit path, the receive path, and the transmit and receive path excluding the first path in which the first circuit component is disposed.

18. The radio-frequency module according to claim 4,
- wherein the first circuit component is disposed in a first path, the first path being one of a transmit path, a receive path, and a transmit and receive path, the transmit path being a path to transfer a transmit signal, the receive path being a path to transfer a receive signal, the transmit and receive path being a path to transfer the transmit signal and the receive signal, and
- wherein the second circuit component is disposed in a second path, the second path being one of the transmit path, the receive path, and the transmit and receive path excluding the first path in which the first circuit component is disposed.

19. The radio-frequency module according to claim 2, further comprising:
- a power amplifier; and
- a low-noise amplifier,
- wherein the first circuit component comprises a first inductor connected with an output terminal of the power amplifier, and
- wherein the second circuit component comprises a second inductor connected with an input terminal of the low-noise amplifier.

20. The radio-frequency module according to claim 3, further comprising:
- a power amplifier; and
- a low-noise amplifier,
- wherein the first circuit component comprises a first inductor connected with an output terminal of the power amplifier, and
- wherein the second circuit component comprises a second inductor connected with an input terminal of the low-noise amplifier.

* * * * *